United States Patent
Chaterji et al.

(10) Patent No.: US 12,175,268 B2
(45) Date of Patent: Dec. 24, 2024

(54) SYSTEM AND METHODS FOR HETEROGENEOUS CONFIGURATION OPTIMIZATION FOR DISTRIBUTED SERVERS IN THE CLOUD

(71) Applicant: Purdue Research Foundation, West Lafayette, IN (US)

(72) Inventors: Somali Chaterji, West Lafayette, IN (US); Saurabh Bagchi, West Lafayette, IN (US); Ashraf Mahgoub, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 803 days.

(21) Appl. No.: 17/139,958

(22) Filed: Dec. 31, 2020

(65) Prior Publication Data

US 2021/0216351 A1    Jul. 15, 2021

Related U.S. Application Data

(60) Provisional application No. 63/027,165, filed on May 19, 2020, provisional application No. 62/961,690, filed on Jan. 15, 2020.

(51) Int. Cl.
  *G06F 9/455*    (2018.01)
  *G06F 9/38*     (2018.01)
  (Continued)

(52) U.S. Cl.
  CPC ........ *G06F 9/45558* (2013.01); *G06F 9/3891* (2013.01); *G06F 9/44505* (2013.01);
  (Continued)

(58) Field of Classification Search
  CPC ............... G06F 9/45558; G06F 9/3891; G06F 9/45505; G06F 16/182; G06F 2009/4557; G06F 2009/45583; G06N 20/00
  See application file for complete search history.

(56) References Cited

U.S. PATENT DOCUMENTS

2018/0287864 A1*  10/2018  Hockett .............. H04L 41/5041
2020/0125568 A1*   4/2020  Idicula ................. G06N 20/20

OTHER PUBLICATIONS

Agrawal, S. et al., Integrating Vertical and Horizontal Partitioning into Automated Physical Database Design. In ACM SIGMOD International Conference on Management of Data, Jun. 13-18, 2004, Paris, France; 12 pgs. (2004).

(Continued)

*Primary Examiner* — Jacob D Dascomb
(74) *Attorney, Agent, or Firm* — Purdue Research Foundation (57) ABSTRACT

A system may forecast a workload for a cluster of nodes in a database management system. The system may generate a reconfiguration plan based on the forecasted workload. The system may obtain a heterogenous configuration set. The heterogenous configuration set may include respective configuration sets for the complete sets of nodes. The system may forecast, based on a first machine learning model, respective performance metrics for nodes in each of the complete sets. The system may forecast a cluster performance metric for the entire cluster of nodes based on a second machine learning model. The system may include, in response to satisfaction of an acceptance criterion, the heterogenous configuration set in the reconfiguration plan. The system may cause the cluster of nodes to be reconfigured based on the reconfiguration plan.

20 Claims, 5 Drawing Sheets

(51) Int. Cl.
    *G06F 9/445*     (2018.01)
    *G06F 16/182*     (2019.01)
    *G06N 20/00*     (2019.01)

(52) U.S. Cl.
    CPC ........... *G06F 16/182* (2019.01); *G06N 20/00* (2019.01); *G06F 2009/4557* (2013.01); *G06F 2009/45583* (2013.01)

(56) References Cited

OTHER PUBLICATIONS

Beckmann, N. et al., LHD: Improving Cache Hit Rate by Maximizing Hit Density. In the Proceedings of the 15th USENIX Symposium on Networked Systems Design and Implementation (NSDI '18), Apr. 9-11, 2018, Renton, WA, USA; pp. 389-403 (2018).

Chaudhuri, S. et al., Self-Tuning Database Systems: A Decade of Progress. In the Proceedings of the 33rd International Conference on Very Large Data Bases (VLDB '07), Sep. 23-28, 2007, Vienna, Austria; pp. 3-14 (2007).

Chaudhuri, S. et al., An Efficient, Cost-Driven Index Selection Tool for Microsoft SQL Server. In the Proceedings of the 23rd VLDB Conference (VLDB '97), Anthens, Greece, pp. 146-155 (1997).

Cidon, A., et al., Cliffhanger: Scaling Performance Cliffs in Web Memory Caches. In the Proceedings of the 13th USENIX Symposium on Networked Systems Design and Implementation (NSDI '16), Mar. 16-18, 2016, Santa Clara, CA, USA; pp. 379-392 (2016).

Cidon, A., et al., Memshare: A Dynamic Multi-Tenant Key-Value Cache. In the Proceedings of the 2017 USENIX Annual Technical Conference (Usenix Atc '17), Jul. 12-14, 2017, Santa Clara, CA, USA; pp. 321-334 (2017).

Curino, C., et al., Schism: a Workload-Driven Approach to Database Replication and Partitioning. In the Proceedings of the VLDB Endowment, vol. 3, No. 1; 11 pgs. (2010).

Dipietro, S. et al., A Queueing Network Model for Performance Prediction of Apache Cassandra. Valuetools 2016, Taormina, Italy IT; 8 pgs .; In Proceedings of the 10th EAI International Conference on Performance Evaluation Methodologies and Tools (2017).

Duan, S., et al., Tuning Database Configuration Parameters with iTuned. In the Proceedings of the VLDB Endowment (VLDB '09), Aug. 24-28, 2009, Lyon, France; pp. 1246-1257 (2009).

Gupta, H. et al., Index Selection for OLAP. In IEEE International Conference on Data Engineering (ICDE); pp. 208-219 (1997); Retrieved from the Internet on Aug. 22, 2024 at https://ieeexplore.ieee.org/document/581755.

Klimovic, A., et al., Pocket: Elastic Ephemeral Storage for Serverless Analytics. In the Proceedings of the13th USENIX Symposium on Operating Systems Design and Implementation (OSDI '18), Oct. 8-10, 2018, Carlsbad, CA, USA; pp. 427-444 (2018).

Kulkarni, C. et al., Rocksteady: Fast Migration for Low-latency In-memory Storage. In the Proceedings of the 26th Symposium on Operating Systems Principles (SOSP '17), Oct. 28, 2017, Shanghai, China, ACM; pp. 390-405 (2017).

Mahgoub, A. et al., Rafiki: A Middleware for Parameter Tuning of NoSQL Datastores for Dynamic Metagenomics Workloads. In Proceedings of the 18th ACM/IFIP/USENIX Middleware Conference (Middleware '17), Dec. 11-15, 2017, Las Vegas, NV, USA, ACM; pp. 28-40 (2017).

Mozafari, B. et al., DBSeer: Resource and Performance Prediction for Building a Next Generation Database Cloud. In the Proceedings of the 6th Biennial Conference on Innovative Data Systems Research (CIDR '13), Jan. 6-9, 2013, Asilomar, CA, USA; 4 pgs. (2013).

Ortiz, J. et al., Changing the Face of Database Cloud Services with Personalized Service Level Agreements. In CIDR (2015); 66 pgs.

Pavlo, A. et al. On Predictive Modeling for Optimizing Transaction Execution in Parallel OLTP Systems. In the Proceedings of the VLBD Endowment, vol. 5, No. 2; pp. 85-96, (2011).

Rao, J. et al., Automating Physical Database Design in a Parallel Database. In Acm Sigmod International Conference on Management of Data, Jun. 4-6, 2002, Madison, WI, USA; pp. 558-569, (2002).

Sullivan, D. G. et al., Using Probabilistic Reasoning to Automate Software Tuning, vol. 32. ACM, 2004; PhD Thesis Sep. 2003; 227 pgs.

Valentin, G. et al., DB2 Advisor: An Optimizer Smart Enough to Recommend its Own Indexes. In the Proceedings of the 16th International Conference on Datda Engineering (ICDE), Feb. 29, 2000-Mar. 3, 2000, San Diego, CA, USA; 10 pgs. (2000).

Venkataraman, S. et al., Ernest: Efficient Performance Prediction for Large-Scale Advanced Analytics. In the Proceedings of the 13th USENIX Symposium on Networked Systems Design and Implementation (NSDI '16), Mar. 16-18, 2016, Santa Clara, CA, USA; pp. 363-378 (2016).

Waldspurger, C. et al., Cache Modeling and Optimization using Miniature Simulations. In the Proceedings of the 2017 USENIX Annual Technical Conference (Usenix Atc '17), Jul. 12-14, 2017, Santa Clara, CA, USA; pp. 487-498 (2017).

Wang, J. et al., The Myria Big Data Management and Analytics System and Cloud Services. Conference Paper, 8th Biennial Conference on Innovative Data Systems Research (CIDR '17), Jan. 8-11, 2017, Chaminade, CA, USA; In CIDR (2017).

Zilio, D. C., Physical Database Design Decision Algorithms and Concurrent Reorganization for Parallel Database Systems. PhD Thesis 1997; Citeseer 1999.

* cited by examiner

SYSTEM AND METHODS FOR HETEROGENEOUS CONFIGURATION OPTIMIZATION FOR DISTRIBUTED SERVERS IN THE CLOUD

CROSS REFERENCE TO RELATED APPLICATIONS

This application claims the benefit of U.S. Provisional Application No. 62/961,690 filed Jan. 15, 2020 and U.S. Provisional Application No. 63/027,165 filed May 19, 2020. The entirety of each of these applications is hereby incorporated by reference.

GOVERNMENT FUNDING

This invention was made with government support under 1R01AI123037 awarded by National Institutes of Health. The government has certain rights in the invention.

TECHNICAL FIELD

This disclosure relates to database management and, in particular, to database management with dynamic, time-varying workloads.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Cloud deployments reduce initial infrastructure investment costs and provide many operational benefits. An important class of cloud deployments is NoSQL databases, which allow applications to scale beyond the limits of traditional databases. Popular NoSQL databases such as Cassandra, Redis, and MongoDB, are widely used in web services, big data services, and social media platforms. Tuning cloud-based NoSQL databases for performance under cost constraints is challenging due to several reasons.

First, the search space is very large due to VM configurations and database application configurations. For example, cloud services provide many VMs that vary in their CPU family, number of cores, RAM size, storage, network bandwidths, etc., which affect the VM's $ cost. At the time of writing, AWS has 133 instance types while Azure has 146 and their prices vary by a factor of 5,000. On the DBMS side, NoSQL databases have many performance-sensitive configuration parameters. For example, Cassandra has 25 such parameters and sub-optimal parameter setting for one parameter (e.g., the Compaction method) can degrade throughput by 3.4× from the optimal. On the cloud side too, selecting the right VM type and size is essential to achieve the best Perf/$.

Second, there is the need for joint optimization while considering the dependencies between the DBMS-level and VM-level configurations. For example, the optimal cache size of Cassandra for a VM type M4.large (with 8 GB of RAM) is 8× the optimal cache size for C4.large (with 3.75 GB RAM). Additionally, larger-sized VMs do not always provide better Perf/$ [62] because they may over-provision resources and unnecessarily increase the $ cost.

Third, there are many use cases of long-running cloud applications. In these, the workload characteristics change over time, sometime unpredictably, necessitating reconfigurations. A configuration that is optimal for one phase of the workload can become very poor for another phase of the workload. For example, in Cassandra, with a large working set size, reads demand instances with high memory, while writes demand high compute power and fast storage.

Changing the configuration at runtime for NoSQL databases, which are stateful applications (i.e., with persistent storage), has a performance impact due to the downtime caused to the servers being reconfigured. Therefore, for fast changing workloads, frequent reconfiguration of the overall cluster could severely degrade performance. Consequently, deciding which subset of servers to reconfigure is vital to minimize reconfiguration performance hit and to achieve globally optimal performance/resource cost while respecting the user's availability requirements. However, changing the configurations of only a subset of servers naturally leads to heterogeneous clusters.

Traditional cloud configuration tuners such as CherryPick and Selecta focus mainly on stateless, recurring workloads, such as big-data analytics jobs, while Paris relies on a carefully chosen set of benchmarks that can be run offline to fingerprint which application is suitable for which VM type. Due to their target of static workloads and stateless jobs, a single cloud configuration is selected based on a representative workload and then fixed throughout the operation period. However, small workload changes can cause these "static tuners" to produce drastically degraded configurations. For example, a 25% increase in workload size with CherryPick makes the proposed configuration 2.6 slower than optimal. Also, it was found that CherryPick's proposed configuration for the write-heavy phase achieves only 12% of the optimal when the workload switches to a read-heavy phase. Hence, these prior systems are not suitable for dynamic workloads.

The system and methods describe herein incorporate and improve aspects of the system and methods described in U.S. application Ser. No. 16/850,755, entitled "CLUSTERED DATABASE RECONFIGURATION SYSTEM FOR TIME-VARYING WORKLOADS", which is hereby incorporated by reference. The system and methods described in U.S. application Ser. No. 16/850,755, and other embodiments thereof, are referred to as "SOPHIA" throughout this disclosure.

SOPHIA addresses database configuration tuning for clustered NoSQL databases and can handle dynamic workloads. However, its design focuses only on DBMS configuration tuning and does not consider cloud VM configurations nor dependencies between VM and DBMS configurations. Naïvely combining the NoSQL and VM configuration spaces causes a major increase in the search space size and limits SOPHIA's ability to provide efficient configurations. Further, due to its atomic reconfiguration strategy (i.e., either reconfigure all servers or none), it suffers from all the drawbacks of the homogeneity constraint.

Accordingly, achieving cost and performance efficiency for cloud-hosted databases involves exploring a large configuration space, including both the parameters exposed by database and the variety of virtual machine (VM) configurations available in the cloud. Even small deviations from an optimal configuration have significant consequences for performance and cost. While traditional approaches that automate cloud deployment configuration can select near optimal instance types for homogeneous clusters of virtual machines and for stateless, recurrent data analytics workloads, such approaches fail to provide heterogenous cluster configurations for time-varying or irregular workloads.

To address these and other technical problems, a system and methods for heterogenous configuration optimization and deployment are provided. By way of introductory example, a system may forecast a workload for a cluster of nodes in a database management system. The system may generate a reconfiguration plan based on the forecasted workload. To generate the reconfiguration plan, the system may identify, in the cluster of nodes, a complete set of nodes where the nodes respectively store different data records, the union of which form a complete set of records for a distributed database. The system may obtain a heterogenous configuration set. The heterogenous configuration set may include respective configuration sets for the complete sets of nodes. The system may forecast, based on a first machine learning model, the forecasted workload, and the heterogenous configuration set, respective performance metrics for at least one node in each of the complete sets. The system may forecast a cluster performance metric for the entire cluster of nodes based on a second machine learning model, the forecasted workload, and the respective performance metrics. The system may determine the cluster performance metric satisfies an acceptance criterion. The system may include, in response satisfaction of the acceptance criterion, the heterogenous configuration set in the reconfiguration plan. The system may cause the cluster of nodes to be reconfigured based on the reconfiguration plan.

The system and methods described herein provide efficient joint optimization of database and cloud configurations to maximize the Perf/$ of a clustered database. The system may identify the minimal set of servers to reconfigure at a time to obtain any benefit. This naturally leads to heterogeneous configurations. To reduce the much larger search space that this causes, the system may group multiple servers that should be configured to the same parameters. The system may be deployed for clusters with different workloads, cluster sizes, data volumes, and/or user-specified requirements for replication and data consistency. In addition, the heterogenous configurations may vary over time in anticipation of dynamic workloads. In various experimentations and examples, using Cassandra and Redis as a database management system, it was found that the reconfiguration system provides 40% higher throughput/$ and 4.5 lower 99-percentile latency on average compared to existing approaches, including CherryPick, Selecta, and SOPHIA. Additional and alternative technical advancements are made evident in the description of the system and methods provided herein.

Figure 1:
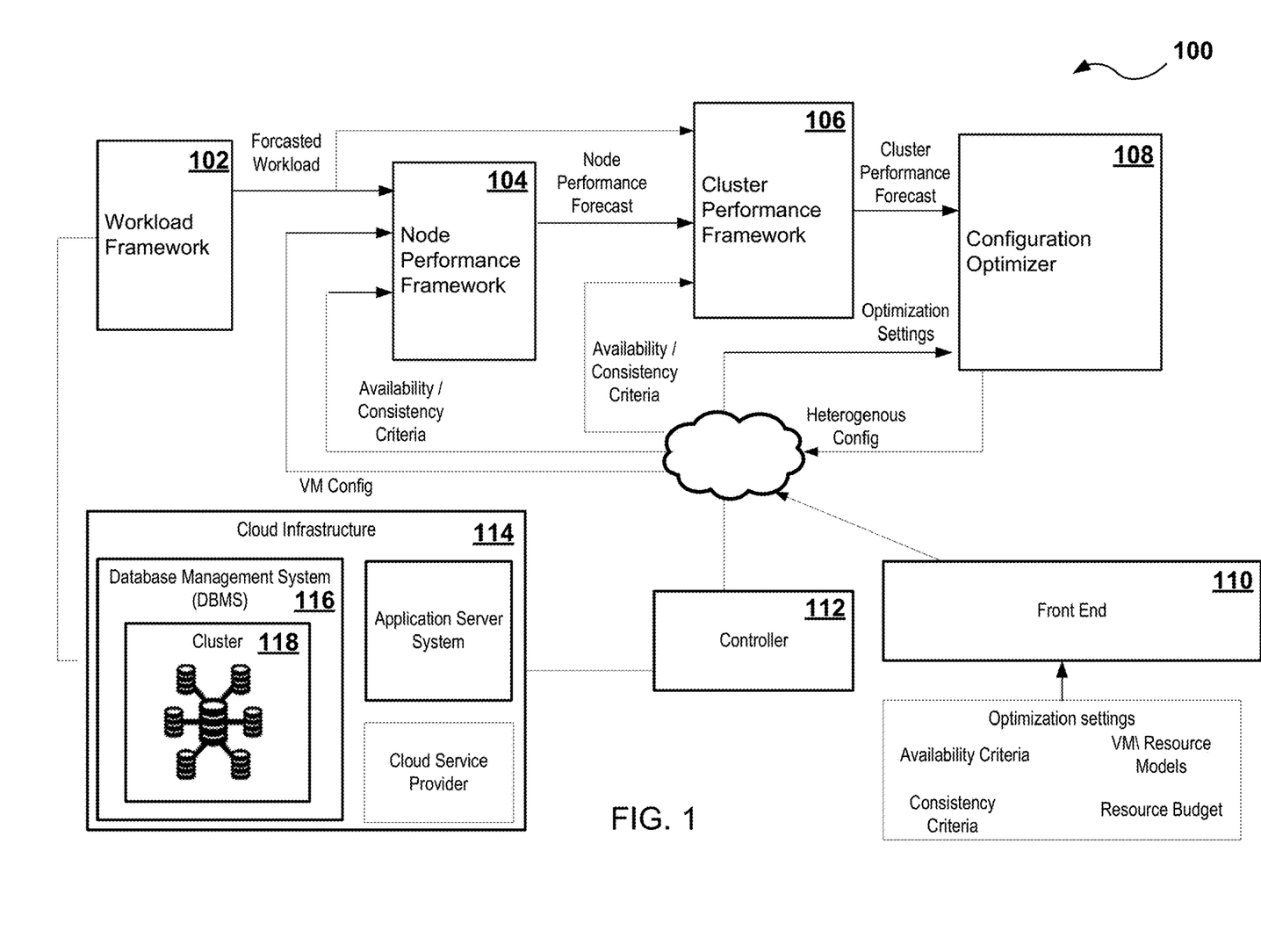
FIG. 1 illustrates a first example of a system.

FIG. 1 illustrates an example of a system 100. The system may include a workload framework 102, a node performance framework 104, a cluster performance framework 106, a configuration optimizer 108, a front end 110, a controller 112, and/or a cloud infrastructure 114.

The cloud infrastructure 114 may include a database management system 116. The database management system 116 may include a node cluster 118. The node cluster 118 may include a group of physical servers, virtual servers (also referred to as virtual machines), or combination of physical and/or virtual servers. The nodes of the node cluster 118 may include respective databases which fragment and/or replicated data as part of a storage protocol for the database management system 116.

Figure 2:
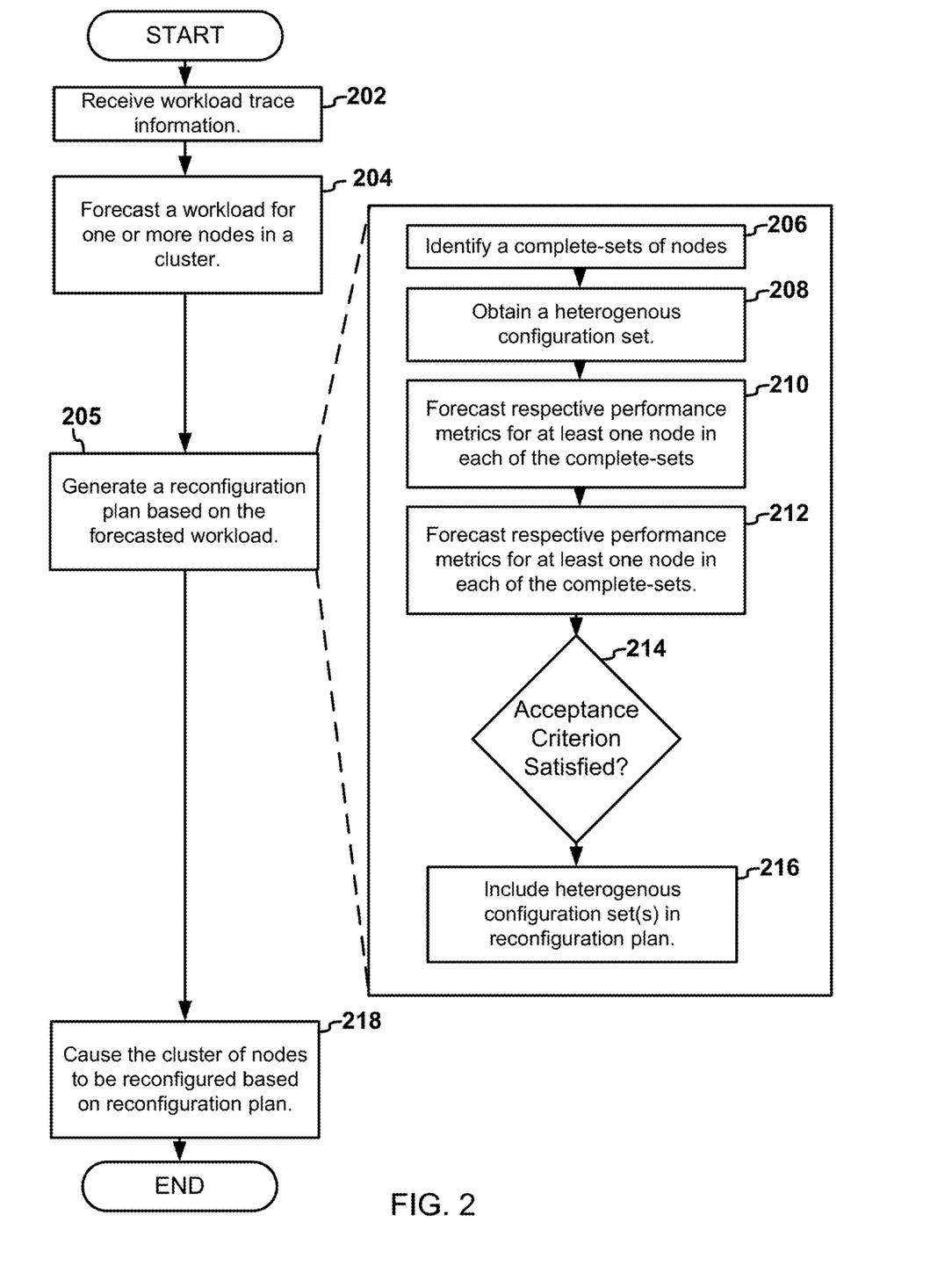
FIG. 2 Illustrates an example of a flow diagram for logic of a system.

FIG. 2 Illustrates an example of a flow diagram for logic of the system 100. During runtime, the workload framework 102 may receive workload trace information (202). The traces may originate from the nodes of the node cluster 118, the database management system 116, and/or the cloud infrastructure 114. Alternatively, or in addition, the traces may be stored in a historical repository, such as a database or data store. The traces may include log data (real-time and/or historical) identifying when data is accessed, what data is accessed, where data is access, how data is access, etc. In various examples, the log data may identify tables, stored procedures, files, database (create-read-update-delete) operations (i.e., CRUD operations), timestamps, requesting user credentials, and/or other information made available by logs of cloud service providers such as MICROSOFT AZURE, AMAZON WEB SERVICES (AWS), etc.

The workload framework 102 may forecast a workload for one or more nodes in a cluster (204). The workload framework 102 may be trained with historical traces from the node(s) and/or database(s) to be tuned. The workload framework 102 may learn time-varying patterns from the workload's historical traces according to a machine learning model, such as a Markov-chain prediction model. Alternatively, or in addition, the workload framework 102 may include complex estimators, such as neural networks.

In an example, to forecast workload, the workload framework 102 may access a query-based model to represent time-varying workloads. This model may characterize the applied workload in terms of the proportion of the different query types and the total volume of queries, denoted by W. The workload framework 102 may predict the workload characteristics for a particular lookahead period. We notate the time varying workload at a given point in time t as W (t). The task of the workload framework 102 is to provide with W (t+1) given W(t), W (t−1), . . . , W (t−h), where h is the length of history. The workload framework 102 may then iteratively predicts the workload till a lookahead time l, i.e., W (t+i), $\forall i \in (1,l)$.

The system may generate a reconfiguration plan based on the forecasted workload (205). The reconfiguration plan may include one or more heterogenous configuration sets. The heterogenous configuration sets may be associated with and/or include respective times such that the reconfiguration plan specifies the times in which reconfiguration should occur. To generate the reconfiguration plan the system may perform one or more operations 206-216, though additional or alternative operations could be included.

The configuration optimizer 108 may identify a complete set of nodes (206). A complete set of nodes may include the minimum subset of nodes for which the union of their data records covers a complete set of records in a distributed datastore. The distributed datastore may include a database or data structure where data and/or fragments of the database are stored across multiple machines. The optimizer may group nodes into complete sets in order to explore configuration parameters for subclusters configurations in the heterogenous configuration set. To see why the notion of complete set is important, consider the two clusters shown in FIG. 3.

Figure 3:
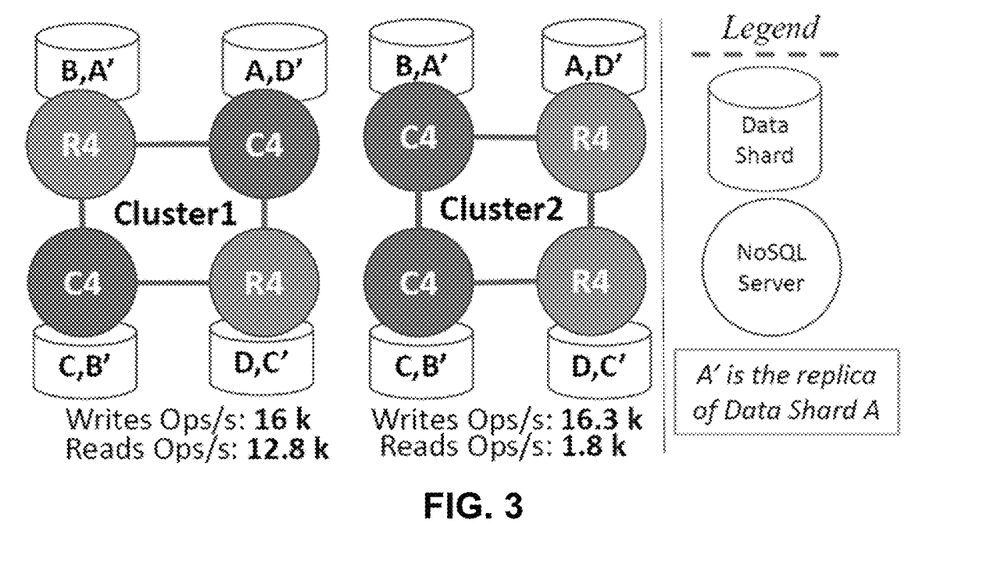
FIG. 3 Illustrates examples complete sets of nodes.

FIG. 3 Illustrates an example of the relative positions of instances on a ring. Both clusters 1 and 2 use two C4.large and two R4.large and hence have the same $ cost. However, Cluster1 achieves 7× the read Ops/s compared to Cluster2. The reason for the better performance of Cluster1 is that it has one Complete set worth of servers configured to the memory-optimized R4.large architecture and therefore serves all read requests efficiently. On the other hand, Cluster2's read performance suffers since all read requests to shard B (or its replica B') have to be served by one of the C4.large servers, which has a smaller RAM and therefore serves most of the reads from desk. Accordingly, read requests to shards B or B' represent a bottleneck in Cluster2 and cause a long queuing time for the reading threads, which brings down the performance the entire cluster for all the shards.

This means that all the servers within a complete set should be upgraded to the faster configuration for the cluster performance to improve. Otherwise, the performance of the complete set will be bounded by the slowest server in the set. The system partitions the cluster into one or more complete sets using the cluster's data placement information.

To identify the complete sets, the optimizer may collect the data placement information for each server of the cluster. In distributed data stores, data is divided by mapping the key values to a hashing function with a known range of values. This range is divided into smaller ranges and each server is responsible for a separate range. Accordingly, data placement information means the range of keys that is assigned to each server. The optimizer queries this information either from any server (such as in Cassandra, using nodetool ring command), from one of the master servers (such as in Redis, using redis-cli cluster info command), or from the cloud service provider interface. In Redis, identifying the Complete sets is easier since data tokens are divided between the master nodes only, while slaves have exact copies of their master's data. Therefore, a Complete set is formed by simply selecting a single slave node for every master node.

Referring back to FIG. 2, the optimizer may obtain a heterogenous configuration set (208). A heterogenous configuration set may include a plurality configuration sets corresponding to respective sub-clusters (i.e. complete sets) of nodes. The heterogenous configuration set is heterogenous because each of the configuration sets may be prepared for a different corresponding complete set of nodes. Together, the different configuration sets are included in the heterogenous configuration set. To say it another way, the heterogeneous configuration set may include a plurality of different homogenous configurations sets. Each homogenous configuration set may include a different corresponding combination of configuration parameters. Each combination of configuration parameters may be tailored for a corresponding complete set of nodes.

A configuration set may include server VM configuration parameter(s), database configuration parameter(s), or a combination thereof. For example, the server VM configuration parameters may include parameters such as instance type, processor count, a processor type, a random-accessed memory size, a hard-drive memory size, and other examples of computer resources described herein or customarily allocated to virtual machines by cloud providers such as MICROSOFT AZURE, AWS, or the like. An instance type parameter may an instance type for a virtual machine, such as T3, M5, Mac, etc (on AWS) or A series, Bs-Series, D-Series on AZURE. In general, the instance type parameter may include a instance type that is associated with a processor count, a processor type, a random-accessed memory size, a hard-drive memory size, or a combination thereof. A cloud service provider may respond to the instance parameter by provisioning a virtual machine or set of virtual machines using computer resources associated with the instance type parameter.

Alternatively or in addition, a configuration set may include configuration parameters customarily associated with database management systems. For example, the configurations parameters may include parameters identifying an amount of computer resources (such as processors, memory, etc) allocated for accessing/hosting a database. In other examples, the configuration parameters may adjust operation of the database including, by way of non-limiting example, cache duration, auto restart, backup scheduling, etc.

A configuration set may be prepared for all of the nodes in a complete set. The nodes that are included in a complete set influences the performance gains achieved by the system and methods described herein. The reconfiguration plan may include a heterogenous combination of multiple configuration sets. The configuration sets may be mapped to reconfigurations times that specify when to trigger reconfiguration for one or more complete set of nodes.

It should be appreciated that combining DBMS and cloud configurations produces a massive search space, which is impractical to optimize through exhaustive search. This search space grows substantially larger given the optimization over a time-window. However, as described herein, not all the application parameters impact performance equally and therefore the configuration optimizer 108 may reduce the search time by automatically selecting the most impactful parameters. Further, there exist dependencies among parameters, such as the dependency between the VM type (EC2) and Cassandra's file-cache-size (FCS). The system may provide a D-optimal design to optimize the offline data collection process for training our performance model. D-Optimal design answers this question: "Given a budget of N data points to sample for a workload, which N points are sufficient to reveal the dependencies between configuration parameters?".

Since dependencies in target applications are generally, at most, pairwise, search may be reduced to linear and quadratic parameters. The system may create a set of filters for feasible combinations of parameter values by mapping each parameter to the corresponding resource (e.g., file-cache-size parameter is mapped to RAM). Afterward, system may check that the sum of all parameters mapped to the same resource is within that resource limit of the VM (e.g., the total size of all Cassandra buffer memories should not exceed the VM instance memory). The system may feed, to D-optimal design, the budget in terms of the number of data points that we can collect for offline training.

The node performance framework 104 may forecast respective performance metrics for at least one node in each of the complete sets (210). The node performance framework 104 may forecast a plurality of performance metrics for the nodes of complete sets respectively, based on a machine learning model. The machine learning model may be previously trained to identify a performance metric representative of a single node based on model inputs comprising the forecasted workload, the configuration parameters, and/or availability/consistency criterion. In some examples, the node performance framework 104 may forecast a performance metric for each individual node.

The cluster performance framework 106 may be trained to map forecasted workload for one or more nodes, forecasted performance for individual node(s), and consistency/availability data to throughput of the heterogeneous cluster of servers. The optimizer may receive the forecasted performance and evaluate the fitness of different VM/application configurations to determine the best performance within a given monetary budget and/or computer resource budget.

The machine learning model may include a random forest. The average output of the different decision trees is taken as the final output. The random forest may provide benefits over other prediction models because of its easily interpretable results and it has only two hyper-parameters to tune (max depth and forest size) compared to black-box models such as DNNs. Thus, the random forest may serve as a regressor and predict the performance of a single server DBMS for any given set of configuration parameters (database configuration, VM configuration, or a combination thereof). Other types of machine learning models for the node performance framework 104 are possible. The combination of feature supplied to the node-performance-framework may be prepared and/or combined in a format acceptable to the machine learning model(s) used. Thus, for example, the workload, configuration data, availability/consistency criterion, etc, may be combined into an input vector or the like.

The cluster performance framework 106 may forecast a performance metric for the entire cluster (212). The forecasted cluster performance metric may be generated with a second machine learning model. The second machine learning model may be trained with input data including the forecasted workload, the forecasted performance metrics for the nodes, respectively, and/or availability/consistency criterion. In various examples, the second machine learning model may include, for example, a second random forest model trained to predict the overall cluster performance, using the predicted performance for each server, RF, CL and data-placement information. In various experiments, it was found that a random forest machine learning model using 20 trees and a maximum depth of each as 5 as gives results within reasonable times. Other types of machine learning models for the cluster performance framework 106 are possible.

The configuration optimizer 108 may determine the performance metric for the entire cluster satisfies an acceptance criterion 100 (214). In response to satisfaction of the acceptance criterion (214, yes), the optimizer may include one or more heterogenous sets in the reconfiguration plan selected for the cluster (216). It should be appreciated that the selection of the reconfiguration plan may occur through multiple iterations of parameter search. Thus, in response to the acceptance criterion not being satisfied (214, no), the optimizer may obtain a new heterogenous configuration set (or multiple configuration sets).

The acceptance criterion may include maximization of the performance of the cluster under a given resource budget and with a minimum acceptable throughput. The acceptance criterion may include additional or alternative logic and criterion as well, as described below.

A reconfiguration plan C may represented as a time series of a vector of configurations (both NoSQL and VM):

$$C = [\{C_1, C_2, \ldots, C_M\}, \{t_1, t_2, \ldots, t_M\}] \quad \text{Equation 1}$$

Where M is the number of steps in the plan and timestamp $t_i$ represents how long the configuration $C_i$ is applied. The lookahead is $$t_L = \sum_{i=1}^{M} t_i.$$

The optimization problem may be defined as:

$$C^* = \underset{C}{\arg\max} \frac{f(W, C)}{\text{Cost}(C)} \quad \text{Equation 2}$$

subject to $f(W, C) \geq \text{minOps}$ & Cost $C \leq \text{Budget}$. Here, $f(W, C)$ is the function that maps the workload vector W and the configuration vector C to the throughput (the cluster prediction model) and C* is the best reconfiguration plan selected by the system. The two constraints in the problem prevent us from selecting configurations that exceed the budget or those that deliver unacceptably low performance.

The optimization problem described in Equation 2 falls under the category of gradient-free optimization problems, in which no gradient information is available nor can any assumption be made regarding the form of the optimized function. For this category of optimization problems, several meta-heuristic search methods have been proposed, such as, Genetic Algorithms (GA), Tabu Search, and Simulated Annealing. GA provides two relevant advantages. First, constraints can be easily included in its objective function (i.e., the fitness function). Second, it provides a good balance between exploration and exploitation through crossover and mutation. In various experiments, the Python Solid library for GA and Scikit-learn for random forests where utilized.

Changing either DBMS or cloud configurations at runtime has a performance cost due to downtime caused to nodes being reconfigured. It was found that most of the performance sensitive DBMS parameters (83% for Cassandra) necessitate a server restart and naturally, changing the VM type needs a restart as well. When a workload change is predicted in the online phase, the configuration optimizer 108 uses its performance framework to propose new configurations for the new workload. Afterwards, the configuration optimizer 108 estimates the reduction in performance given the expected downtime duration and compares that to the expected benefit of the new configurations. The configuration optimizer 108 selects configurations that maximize the difference between the benefit and the cost. This cost-benefit analysis prevents the system from taking greedy decisions, whenever the workload changes. Rather, it uses a long-horizon prediction of the workload over a time window to decide which reconfiguration actions to instantiate and when.

The benefit of the $i^{th}$ step in the plan is given by:

$$B_{(i+1,i)} = \sum_{t \in t_{i+1}} f(W_t, C_{i+1}) - f(W_t, C_i) \quad \text{Equation 3}$$

where $f(W_t, C_{j+1})$ is the predicted throughput using the new configuration $C_{i+1}$. The configuration cost is given by:

$$L_{(i+1,i)} = \sum_{p \in (C_i - C_{i+1})} t_{down} \times \delta_p \times f(W_t, C_i) \qquad \text{Equation 4}$$

where p is any complete set that is being reconfigured to move from configuration $C_i$ to $C_{i+1}$, $t_{down}$ is the expected downtime during this reconfiguration step, and $\delta_p$ is the portion of the cluster throughput that p contributes as estimated by our cluster framework. The value of $t_{down}$ is measured empirically and its average value, under various experimental setups, was found to be around 30 sec for NoSQL configurations and 90 sec for VM configurations.

After the reconfiguration plan is generated, the controller 112 may cause the cluster of nodes to be reconfigured based on the reconfiguration plan (218). For example, the node may communicate with the cloud infrastructure 114 to cause servers to be reconfigured. Reconfiguration of the servers may involve on-the-fly reconfiguration or even reprovisioning a server instance. Alternatively or in addition, the controller 114 may communicate with a server directly or with applications executing on the server. For example, the controller 114 may communicate with an application running as part of a DBMS. The controller 114 may cause one or more databases to be reconfigured and/or reprovisioned according to the reconfiguration plan.

In some examples, the reconfiguration plan may include multiple heterogenous configurations mapped to corresponding reconfiguration times. The controller 112 may execute reconfiguration/reprovisioning, as previously described, at the reconfiguration times.

In some examples, the front end 110 may provide one or more interfaces (such as a graphical user interface, application programming interface etc) for receiving configurable information that affects optimization. For example, the front end may receive various optimization settings including availability criterion (RF), consistency level criterion (CL), VM/Resource models that define the specifications and configuration settings for virtual machines and/or databases. The availability criterion may include, for example, that each data record is replicated 3 times, each in a separate server (i.e. RF=3) The consistency criterion may include, for example, that for a request to be successful, at least 2 replicas must respond with the same value (i.e. CL=2). Alternatively or in addition, the optimizations may include resource budgets that identify restrictions on available computing resources in terms of monetary cost and/or computer resource availability.

Technical Insights

There are at least three key notable insights behind the system. The first is that jointly tuning the database and cloud (VM) configurations for dynamic workloads provides large performance benefits. To demonstrate, a Cassandra server with benchmarked with a 30-min trace from a workload (MG-RAST) on 9 different EC2 VM types. For each type, 300 different database configurations were selected through grid search.

Figure 4:
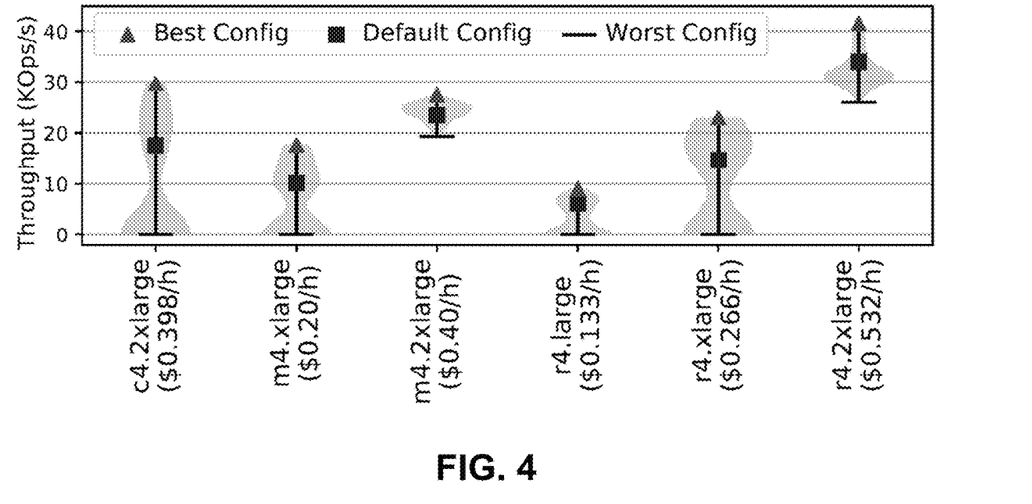
FIG. 4 illustrates an example of a violin plot showing performance of best, default, and worst database configurations across different virtual machine types.

FIG. 4 illustrates the performance in terms of Ops/s for the best, default and worst configurations. As shown in FIG. 4, a big variance exists in performance w.r.t. the database configurations—up to 74% better performance over default configurations (45% on average). Further, the optimal configurations vary with the VM type and size (for the six VM types shown here, there are five distinct best DB configu- rations). This emphasizes the benefits to be gained by tuning both types of configurations jointly to achieve the best Perf/$.

The second key insight is that performing non-atomic reconfigurations, i.e., for only part of the cluster, leads to optimization of the Perf/$ for a dynamic workload. Reconfiguration in a distributed datastore is a sequential operation (in which one or a few servers at a time are shutdown and then restarted) to preserve data availability. This operation causes transient performance degradation or lower fault tolerance. Reconfiguration is frequent enough for many workloads that this performance degradation should be avoided, e.g., MG-RAST has a median of 430 significant switches per day in workload characteristics. Accordingly, heterogeneous configurations have the advantage of minimizing the performance hit during reconfiguration. Further, in the face of dynamic workloads, there may only be time to reconfigure part of the overall cluster. Also, from a cost-benefit standpoint, maximizing performance does not need all instances to be reconfigured (such as to a more resource-rich instance type), but rather a carefully selected subset.

The third key insight is that for a particular NoSQL database (with its specifics of data placement and load balancing), it is possible to create a model to map the configuration parameters to the performance of each server. From that, it is possible to determine the overall heterogeneous cluster's performance. The system leverages performance modeling to search for the optimal cluster configuration. In various experiments, examples of system were implemented with two popular NoSQL databases—Cassandra and Redis—and evaluated using traces from two real-world systems, and one simulated trace from an HPC analytics job queue. All three use cases represent dynamic workloads with different query blends.

The Perf/$ achieved by the system was compared to three leading prior works, CherryPick, Selecta, and SOPHIA. Additionally, the system was compared to the best static configuration determined with oracle-like prediction of future workloads and the theoretical best. It was found that system achieves between 80-90% of the theoretical best performance for the three workloads and achieves improvements between 9%-86.5%, 18%-173%, 17%-174%, and 12%-514% in Perf/$ over Homogeneous-Static, CherryPick, Selecta, and SOPHIA respectively without degrading P99 latency.

Figure 5:
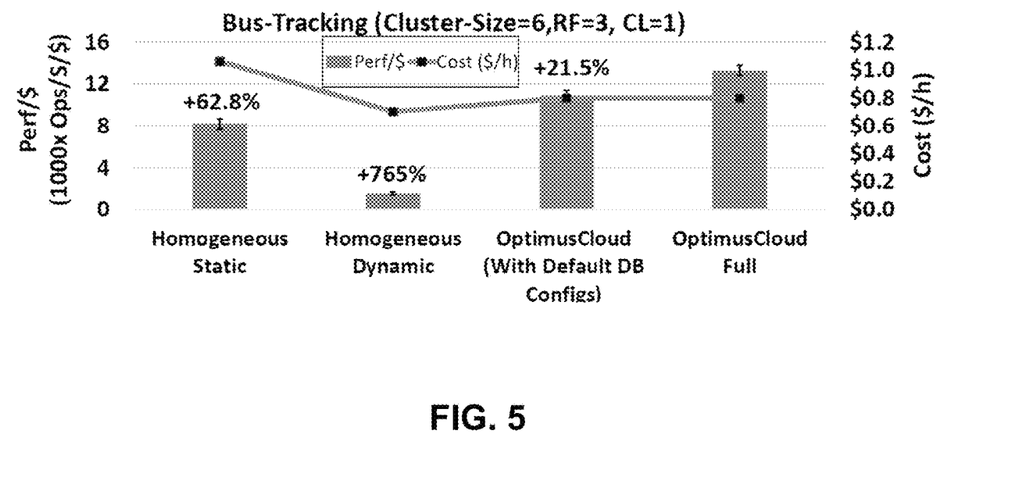
FIG. 5 illustrates an example of optimization achieved by reconfiguring nodes according to various aspects of a system and methods described herein.

FIG. 5 illustrates optimizations achieved in a bus-tracking example due to heterogeneous configurations and various aspects of the system. Tuning both application and cloud configurations benefit over tuning only the VM configuration (3rd bar from left). The percentage value on the top of each bar denotes how much the system improves over that particular scheme.

To further understand the generalizability of the system, consider two popular NoSQL databases with very different architectures—Casandra and Redis. In various examples herein, Casandra and Redis are used to demonstrate the technical advancements achieved by the system and methods described herein. It should be appreciated that the system and methods described herein could be applied to other types and implementations of databases and database management systems.

Cassandra is designed for high scalability, availability, and fault-tolerance. To achieve these, Cassandra uses a peer-to-peer (P2P) replication strategy, allowing multiple replicas to handle the same request. Other popular datastores such as DynamoDB and Riak implement the same P2P strategy and we select Cassandra as a representative system from that category. Cassandra's replication strategy determines where replicas are placed. The number of replicas is defined as "Replication Factor" (RF). By default, Cassandra assigns an equal number of tokens to each node in the cluster where a token represents a sequence of hash values for the primary keys that Cassandra stores. Based on this token assignment, a Cassandra cluster can be represented as a ring topology. FIG. 3 shows an example of 4 Cassandra servers (RF=2, CL=1).

As illustrated in FIG. 3, Cluster performance depends not just on the configuration of each server, but also on the relative positions of the instances on the token ring. Cluster1 achieves 7× reads Ops/s over Cluster2 with the same VM types and sizes.

Redis is an in-memory database and serves all requests from the RAM, while it writes data to permanent storage for fault tolerance. This design principle makes Redis an excellent choice to be used as a cache on top of slower file systems or datastores. Redis can operate as either a stand-alone node or in a cluster of nodes where data is automatically sharded across multiple Redis nodes. The clustered mode of Redis is relevant to the system and methods described herein. When a Redis server reaches the maximum size of its allowed memory (specified by the max memory configuration parameter), it uses one of several policies to decide how to handle new write requests. The default policy will respond with error. Other policies will replace existing records with the newly inserted record (the max memory-policy configuration parameter specifies which records will be evicted). The value of max memory needs to be smaller than the RAM size of the VM instance and the headroom that is needed is workload dependent (lots of writes will need lots of temporary buffers and therefore larger head room). Thus, it is challenging to tune max memory-policy and max memory parameters with changing workloads and these two form the target of our configuration decision.

Rationale for Heterogeneous Configurations

The following is a motivating example for selecting subset of servers to reconfigure. Consider a Cassandra cluster of 4 nodes with a consistency-level (CL)=1 and replication-factor (RF)=3, i.e., any pair of nodes has a complete copy of all the data. Also, assume that we only have two cloud configurations: C4.large, which is compute-optimized, and R4.xlarge, which is memory-optimized. C4.large is cheaper than R4.xlarge by 58%, whereas R4.xlarge has larger RAM (30.5 GB vs 3.75 GB) and serves read-heavy workloads with higher throughput.

Figure 6:
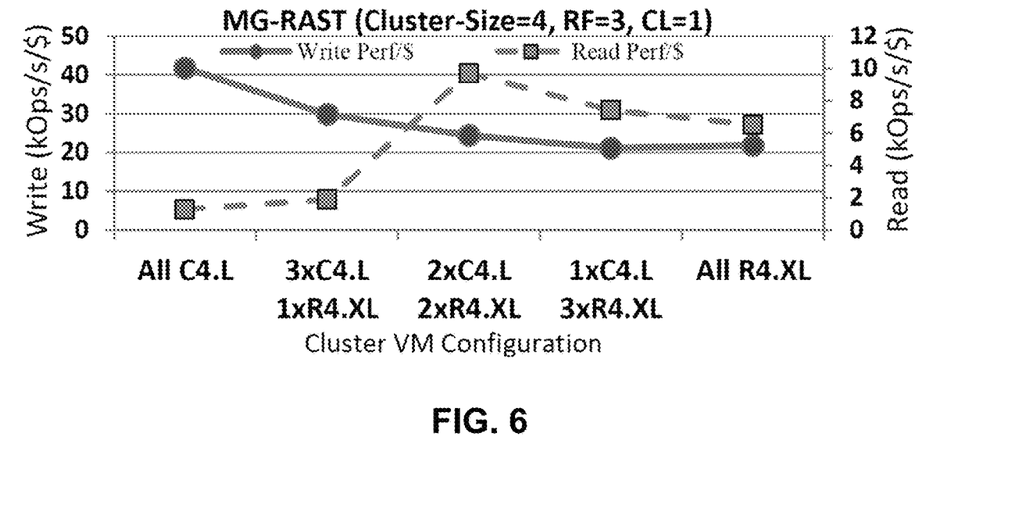
FIG. 6 illustrates an example of optimization achieved by reconfiguring nodes according to various aspects of a system and methods described herein.

FIG. 6 illustrates an example of change in Perf/$ for the write (solid) and read throughput (dotted) as the system 100 reconfigure the nodes from C4.large to R4.xlarge. The performance of all possible combinations of VM configurations (All C4.L, 1 C4.L+3R4.XL, . . . etc.) is tested for both read-heavy and write-heavy phases of the MG-RAST workload and show the saturation level throughput for each configuration in FIG. 6. All C4.large configuration achieves the best write Perf/$ (41.7 KOps/s/$), however, it has the worst read Perf/$ (only 1.28 KOps/s/$) because reads of even common records spill out of memory. Now if two servers are reconfigured to R4.xlarge, the write Perf/$ decreases (24.4 KOps/s/$), while the read performance increases significantly (9.7 KOps/s/$), showing an improvement of 7.5 for read throughput over the all C4.large configuration. The reason for this huge improvement is Cassandra's design by which it redirects new requests to the fastest replica, directing all read requests to the two R4.xlarge servers. Now we notice that switching more C4.large servers to R4.xlarge does not show any improvement in either reads or writes Perf/$, as the two R4x.large servers are capable of serving the applied workload with no queued requests. This means that switching more servers will only reduce the Perf/$. Thus, the best Perf/$ is achieved by configuring to all C4.large in write-heavy phases, while configuring only 2 servers to R4x.large in read-heavy phases. Therefore, heterogeneous configurations achieve better Perf/$ compared to homogeneous ones under mixed workloads.

Maintaining Data Availability

To satisfy the data available requirement during reconfiguration, at least CL replicas of each data record must be up at any point in time. This puts an upper limit on the number of complete sets that can be reconfigured concurrently as Count(complete_sets)−CL. The number of complete sets in a cluster is not dependent on the number of nodes in the cluster, but is a constant factor. This means that since the system reconfigures the instances in groups of one or more complete sets, the total time to reconfigure a cluster is a constant factor independent of the cluster size.

Thus, it can be said that the system partitions the cluster into s complete sets, and s is independent of the cluster size N. The proof for this assertion is that for a cluster of N servers with replication factor RF, there exists a total of RF copies of each record in the cluster, with no two copies of the same record stored in the same server. Assuming each node in the cluster is assigned an equal portion of the data (which NoSQL load-balancers try to achieve), the size of a complete set is:

$$\text{Size}_{CompSet} = \left\lceil \frac{N}{RF} \right\rceil \qquad \text{Equation 5}$$

Consequently, the number of Complete sets in the cluster is:

$$S = \left\lfloor \frac{N}{\text{Size}_{compSet}} \right\rfloor \qquad \text{Equation 6}$$

If RF divides N, then the number of Complete sets is:

$$S = \frac{N}{\text{Size}_{CompSet}} = RF \qquad \text{Equation 7}$$

Else, say N % RF=r, then:

$$S = \frac{RF}{1 - r/N + RF/N} \qquad \text{Equation 8}$$

which is ≈RF since in practice RF is not large, 3 being an example of a practical upper bound. Accordingly, the number of complete sets is independent of the cluster size and hence the reconfiguration time is also a constant.

Search Space Size Reduction

Heterogeneous configurations make the search space size much larger than with homogeneous configurations. Consider a cluster of N nodes and IVM options to pick from. If we are to pick a homogeneous cloud configuration for the cluster, we have I options. However, if we are to pick a heterogeneous cloud configuration, our search space becomes $I^N$. If we assume balanced data placement among the servers in the cluster (as clustered NoSQL databases are designed for), the search space becomes C(N+I−1, I−1) (distribute N identical balls among I boxes). However, this search space size is still too large to perform an exhaustive search to pick the optimal configurations.

A cluster of size N=20 nodes and I=15 VM options gives $1.3 \times 10^9$ different configurations to select from. The identification of complete sets reduce the search space. The nodes within each complete set should be homogeneous in their configuration. Otherwise, the performance of the complete set will be equal to that of the slowest node in the set. This means that the smallest atomic unit of reconfiguration is one complete set. This insight reduces the search space, while still allowing different complete sets to have different configurations. Thus, the search space reduces to C(S+I−1, I−1)=680 configurations when S=RF=3. Also note that the configuration search space is constant rather than growing with the size of the cluster.

Distinctions from Other Approaches

We describe the substantive conceptual differences of the system from two recent, related works: Selecta and SOPHIA. The system provides joint configuration tuning of both DBMS and cloud VMs, while it considers heterogeneous clusters to achieve the best Perf/$. In Selecta, only heterogeneous cloud storage configurations are permissible. Accordingly, the configuration space in Selecta is much smaller and simpler to optimize using matrix factorization techniques. A simple extension of Selecta to our large search space produces very poor performance due to the sparsity of the generated matrix and the dependency between DBMS and cloud configurations.

In SOPHIA, only DBMS parameters are configured and no computing platform parameters such as VM configurations. Even within DBMS configurations, it only considers homogeneous configurations. Accordingly, SOPHIA makes a much simpler decision to either configure the complete cluster to the new configuration, or keep the old configuration—correspondingly its cost-benefit analysis is also coarse-grained, at the level of the entire cluster. For fast-changing workloads, it therefore often has to stick to the current configuration since there is not enough time to reconfigure the entire cluster (which needs to be done in a partly sequential manner to preserve data availability). Similar to Selecta, a simple extension of SOPHIA to VM options cannot achieve the best Perf/$ for dynamic workloads, as it can only create homogeneous configurations across all phases of the workload.

The system may be implemented with additional, different, or fewer components than illustrated. Each component may include additional, different, or fewer components.

Figure 7:
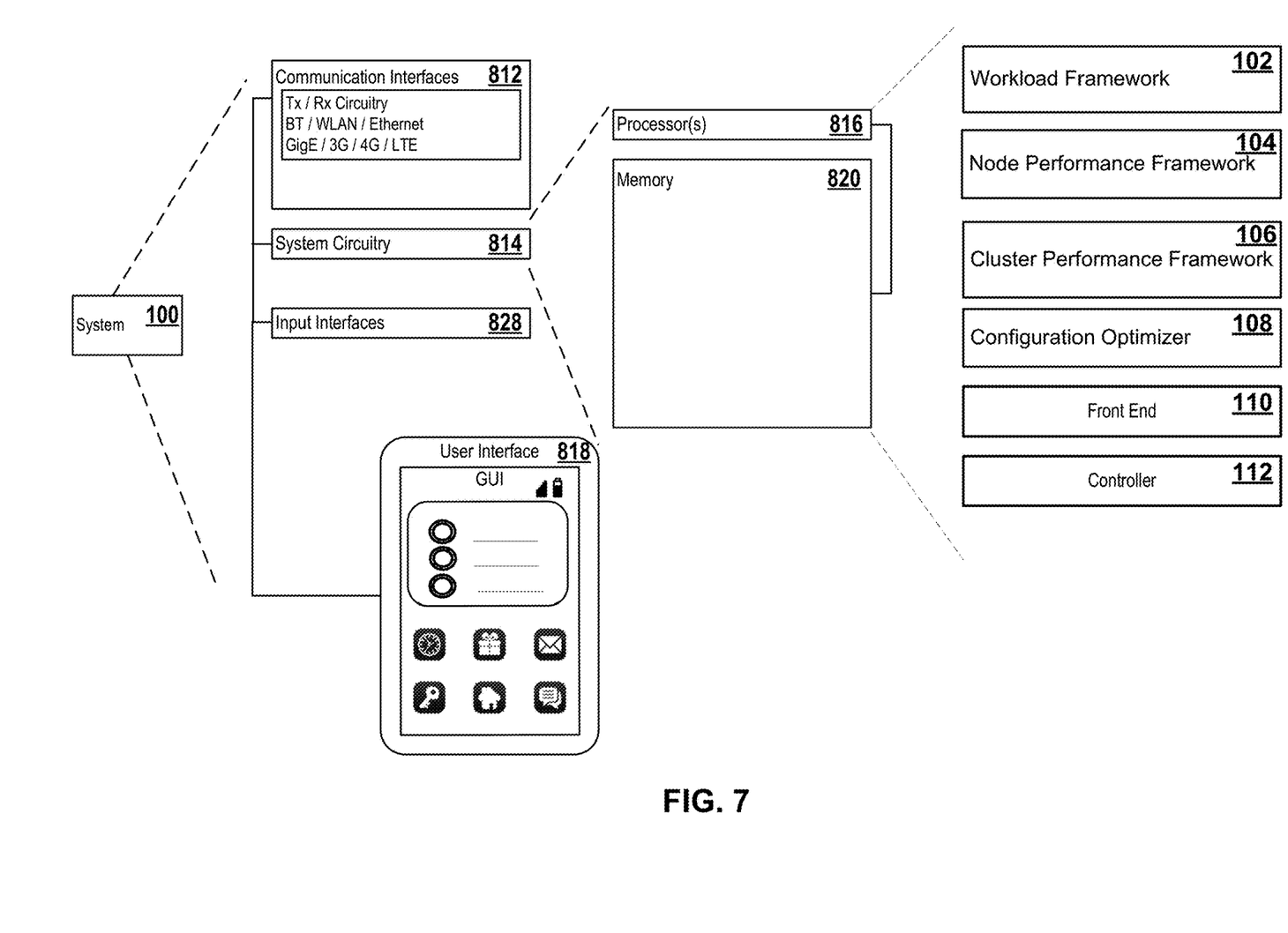
FIG. 7 illustrates a second example of a system.

FIG. 7 illustrates a second example of the system described herein. The system 100 may include communication interfaces 812, input interfaces 828 and/or system circuitry 814. The system circuitry 814 may include a processor 816 or multiple processors. Alternatively or in addition, the system circuitry 814 may include memory 820.

The processor 816 may be in communication with the memory 820. In some examples, the processor 816 may also be in communication with additional elements, such as the communication interfaces 812, the input interfaces 828, and/or the user interface 818. Examples of the processor 816 may include a general processor, a central processing unit, logical CPUs/arrays, a microcontroller, a server, an application specific integrated circuit (ASIC), a digital signal processor, a field programmable gate array (FPGA), and/or a digital circuit, analog circuit, or some combination thereof.

The processor 816 may be one or more devices operable to execute logic. The logic may include computer executable instructions or computer code stored in the memory 820 or in other memory that when executed by the processor 816, cause the processor 816 to perform the operations of the workload framework 102, the node performance framework 104, the cluster performance framework 106, the configuration optimizer 108, the front end 110, the controller 112, the system 100, and/or any component or subcomponent of the system 100 described herein. The computer code may include instructions executable with the processor 816.

The memory 820 may be any device for storing and retrieving data or any combination thereof. The memory 820 may include non-volatile and/or volatile memory, such as a random access memory (RAM), a read-only memory (ROM), an erasable programmable read-only memory (EPROM), or flash memory. Alternatively or in addition, the memory 820 may include an optical, magnetic (hard-drive), solid-state drive or any other form of data storage device. The memory 820 may include the workload framework 102, the node performance framework 104, the cluster performance framework 106, the configuration optimizer 108, the front end 110, the controller 112, the system 100, and/or any component or subcomponent of the system 100 described herein.

The user interface 818 may include any interface for displaying graphical information. The system circuitry 814 and/or the communications interface(s) 812 may communicate signals or commands to the user interface 818 that cause the user interface to display graphical information. Alternatively or in addition, the user interface 818 may be remote to the system 100 and the system circuitry 814 and/or communication interface(s) may communicate instructions, such as HTML, to the user interface to cause the user interface to display, compile, and/or render information content. In some examples, the content displayed by the user interface 818 may be interactive or responsive to user input. For example, the user interface 818 may communicate signals, messages, and/or information back to the communications interface 812 or system circuitry 814.

The system 100 may be implemented in many ways. In some examples, the system 100 may be implemented with one or more logical components. For example, the logical components of the system 100 may be hardware or a combination of hardware and software. The logical components may include the workload framework 102, the node performance framework 104, the cluster performance framework 106, the configuration optimizer 108, the front end 110, the controller 112, the system 100, and/or any component or subcomponent of the system 100 described herein. In some examples, each logic component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each component may include memory hardware, such as a portion of the memory 820, for example, that comprises instructions executable with the processor 816 or other processor to implement one or more of the features of the logical components. When any one of the logical components includes the portion of the memory that comprises instructions executable with the processor 816, the component may or may not include the processor 816. In some examples, each logical component may just be the portion of the memory 820 or other physical memory that comprises instructions executable with the processor 816, or other processor(s), to implement the features of the corresponding component without the component including any other hardware. Because each component includes at least some hardware even when the included hardware comprises software, each component may be interchangeably referred to as a hardware component.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

All of the discussion, regardless of the particular implementation described, is illustrative in nature, rather than limiting. For example, although selected aspects, features, or components of the implementations are depicted as being stored in memory(s), all or part of the system or systems may be stored on, distributed across, or read from other computer readable storage media, for example, secondary storage devices such as hard disks, flash memory drives, floppy disks, and CD-ROMs. Moreover, the various logical units, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer and/or central processing unit ("CPU").

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:
1. A system comprising:
a processor, the processor configured to:
forecast a workload for a cluster of nodes in a database management system;
generate a reconfiguration plan based on the forecasted workload wherein to generate the reconfiguration plan, the processor is configured to:

identify, in the cluster of nodes, complete sets of nodes where the nodes of each of the complete sets respectively store different data records, the union of which form a complete set of records for a distributed database;

obtain a heterogeneous configuration vector for the complete sets, the heterogeneous configuration vector comprising a plurality of configuration sets corresponding to the complete sets of nodes, respectively, wherein each of the configuration sets comprise a different group of configurations parameters;

forecast, based on a first machine learning model, the forecasted workload, and the heterogeneous configuration vector for the complete sets, respective performance metrics for at least one node in each of the complete sets;

forecast a cluster performance metric for the entire cluster of nodes based on a second machine learning model, the forecasted workload, and the respective performance metrics forecasted from the first machine learning model;

determine the cluster performance metric satisfies an acceptance criterion; and include, in response to satisfaction of the acceptance criterion, the heterogeneous_configuration vector in the reconfiguration plan; and cause the cluster of nodes to be reconfigured based on the reconfiguration plan, wherein all of the nodes in each complete set of nodes are homogeneously reconfigured with a same corresponding configuration set from the configuration vector, wherein the complete sets of nodes are heterogeneously reconfigured with different configuration sets, respectively, from the configuration vector.

2. The system of claim 1, wherein to generate the reconfiguration plan, the processor is further configured to:
map the configuration sets to respective reconfiguration times.

3. The system of claim 2, wherein to cause the cluster of nodes to be reconfigured based on the reconfiguration plan, the processor is further configured to:
instruct, at each of the reconfiguration times, a cloud service provider to re-provision nodes of one or more complete sets according to the respective configuration sets.

4. The system of claim 2, wherein to cause the cluster of nodes to be reconfigured based on the reconfiguration plan further comprises:
triggering, at a first reconfiguration time, all of the nodes of a first complete set to be reprovisioned based on a first configuration set; and
triggering, at a second reconfiguration time, all of the nodes of a second complete set to be reprovisioned based on a second configuration set.

5. The system of claim 1, wherein the first machine learning model is previously trained to identify a performance metric representative of a single node based on training data comprising a time-varying workload and configuration parameters configured on the single node during processing of the time-varying workload.

6. The system of claim 1, wherein the second machine learning model is previously trained to identify the cluster performance metric based on training data comprising a time-varying workload and respective performance metrics output by the first machine learning model.

7. The system of claim 1, wherein the first machine learning model is a first random forest model and the second machine learning model is a second random forest model.

8. The system of claim 1, wherein each of the respective configuration sets comprise a corresponding instance type parameter, the instance type parameter specifying an instance type for a virtual machine.

9. The system of claim 8, where the instance type parameter is associated with a processor count, a processor type, a random-accessed memory size, a hard-drive memory size, or a combination thereof.

10. The system of claim 1, wherein at least one of the respective configuration sets includes a configuration parameter specifying an amount of computer resources allocated to a database.

11. A method comprising:
forecasting, by a processor, a workload for a cluster of nodes in a database management system;
identifying, in the cluster of nodes, a complete set of nodes where the nodes of the complete set are a subset of the cluster and respectively store different data records, the union of which form a complete set of records for a distributed database;
obtaining a heterogeneous configuration vector, the heterogeneous configuration vector comprising respective configuration sets for the complete sets of nodes, wherein each of the respective configuration sets comprise a different group of configurations parameters;
forecasting, based on a first machine learning model, the forecasted workload, and the heterogeneous configuration vector, respective performance metrics for at least one node in each of the complete sets;
forecasting a cluster performance metric for the entire cluster of nodes based on a second machine learning model, the forecasted workload, and the respective performance metrics;
determining whether the cluster performance metric satisfies an acceptance criterion;
modifying, in response to the acceptance criterion not being satisfied, a configuration parameter in the heterogeneous configuration vector; and
causing, in response to satisfaction of the acceptance criterion, the cluster of nodes to be reconfigured based on a reconfiguration plan comprising the heterogeneous configuration vector,
wherein all of the nodes in each complete set of nodes are homogeneously reconfigured with a same corresponding configuration set,
wherein the complete sets of nodes are heterogeneously reconfigured with different configuration sets, respectively.

12. The method of claim 11, wherein obtaining the heterogeneous configuration vector further comprises:
mapping reconfiguration times to the configuration sets, respectively.

13. The method of claim 12, wherein in response to satisfaction of the acceptance criterion:
chronologically triggering, based on the reconfiguration times, a cloud service provider to re-provision nodes of one or more complete sets according to the configuration sets.

14. The method of claim 12, wherein in response to the acceptance criterion not being satisfied:
changing at least one of the reconfiguration times.

15. The method of claim 11, wherein the first machine learning model is previously trained to identify a performance metric representative of a single node based on training data comprising a time-varying workload and configuration parameters configured on the single node during processing of the time-varying workload.

16. The method of claim 11, wherein the second machine learning model is previously trained to identify the cluster performance metric based on training data comprising a time-varying workload and respective performance metrics output by the first machine learning model.

17. The method of claim 11, wherein the first machine learning model is a first random forest model and the second machine learning model is a second random forest model.

18. The method of claim 11, wherein each of the respective configuration sets comprise a corresponding instance type parameter, the instance type parameter specifying an instance type for a virtual machine.

19. The system of claim 18, where the instance type parameter is associated with a processor count, a processor type, a random-accessed memory size, a hard-drive memory size, or a combination thereof.

20. The system of claim 11, wherein at least one of the respective configuration sets include a configuration parameter specifying an amount of computer resources allocated to a database.

* * * * *